United States Patent
Ikumori

(10) Patent No.: US 11,425,312 B2
(45) Date of Patent: Aug. 23, 2022

(54) IMAGE PROCESSING PROGRAM, AND IMAGE PROCESSING SYSTEM CAUSING A SERVER TO CONTROL SYNTHESIS OF A REAL SPACE IMAGE AND A VIRTUAL OBJECT IMAGE

(71) Applicant: SQUARE ENIX CO., LTD., Tokyo (JP)

(72) Inventor: Kazuyuki Ikumori, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 0 days.

(21) Appl. No.: 17/002,148

(22) Filed: Aug. 25, 2020

(65) Prior Publication Data
US 2021/0067677 A1    Mar. 4, 2021

(30) Foreign Application Priority Data
Aug. 29, 2019 (JP) .............................. JP2019-156600

(51) Int. Cl.
*H04N 5/235* (2006.01)
*H04N 5/222* (2006.01)

(52) U.S. Cl.
CPC ......... *H04N 5/2354* (2013.01); *H04N 5/2224* (2013.01); *H04N 5/2351* (2013.01)

(58) Field of Classification Search
CPC .. H04N 5/2354; H04N 5/2224; H04N 5/2351; H04N 5/23229; H04N 13/122; A63F 13/216; A63F 13/52; A63F 13/65
See application file for complete search history.

(56) References Cited

U.S. PATENT DOCUMENTS

| | | | | |
|---|---|---|---|---|
| 8,659,624 | B2* | 2/2014 | Matsui | G06T 15/50 345/633 |
| 2008/0024523 | A1* | 1/2008 | Tomite | G06T 19/006 345/632 |
| 2013/0194305 | A1* | 8/2013 | Kakuta | G06T 19/006 345/633 |

FOREIGN PATENT DOCUMENTS

| | | |
|---|---|---|
| JP | 2008016918 A | 1/2008 |
| JP | 2013196616 A | 9/2013 |
| JP | 2013242865 A | 12/2013 |

OTHER PUBLICATIONS

Japanese Office Action for JP Application No. 2019-156600, dated Oct. 27, 2020.

* cited by examiner

*Primary Examiner* — Luong T Nguyen
(74) *Attorney, Agent, or Firm* — Dorsey & Whitney LLP

(57) ABSTRACT

A non-transitory computer-readable medium including an image processing program is provided. To control synthesis of a real space image and a virtual object image, the image processing program causes a server to: obtain positional information of a real space image and a user terminal with a photographing device from the user terminal; refer to a storing unit storing information defined in advance as light source related information and positional information so as to be associated with each other, to specify the light source related information corresponding to positional information of the user terminal; set a virtual light source for a virtual object on a basis of the specified light source related information; generate a virtual object image on a basis of the set virtual light source; and output a synthetic image obtained by synthesizing the generated the virtual object image and the real space image.

8 Claims, 9 Drawing Sheets

LIGHT SOURCE RELATED INFORMATION

| POSITIONAL INFORMATION | LIGHT SOURCE RELATED INFORMATION | ... |
|---|---|---|
| ○○ BUILDING | WINDOW AND SHADE AT NORTH SIDE<br>TWO FLUORESCENT LIGHTS | ... |
| XX BUILDING | WINDOW AND SHADING CURTAIN AT SOUTH SIDE<br>FOUR FLUORESCENT LIGHTS | ... |
| ⋮ | ⋮ | ⋮ |

IMAGE PROCESSING PROGRAM, AND IMAGE PROCESSING SYSTEM CAUSING A SERVER TO CONTROL SYNTHESIS OF A REAL SPACE IMAGE AND A VIRTUAL OBJECT IMAGE

CROSS-REFERENCE TO RELATED APPLICATION(S)

The present application claims priority to Japanese Patent Application No. 2019-156600 filed on Aug. 29, 2019, the disclosure of which is expressly incorporated herein by reference in its entirety.

BACKGROUND OF THE INVENTION

1. Field of the Invention

At least one of embodiments of the present invention relates to an image processing program and an image processing system for causing a server to perform functions to control synthesis of a real space image and a virtual object image.

2. Description of the Related Art

Heretofore, various techniques have been proposed for estimating a position of a light source from a photographing situation.

In such a technique, for example, there is one in which a position, color, and illuminance of a light source estimated from a photographing situation. Examples of apparatuses, systems, and methods may be found in Japanese Published Patent Application No. JP2008-016918.

SUMMARY

However, in the conventional technique, in a case where it is difficult to accurately estimate information regarding a light source (for example, light source related information) from a photographing situation, there have been cases where accurate light source related information is reflected to a so-called AR object. Namely, for example, in an environment where a plurality of lights exists around a photographing apparatus, it may become difficult to accurately estimate positions of the plurality of light sources from information obtained from a photographed image to reflect them to an AR object because a processing load thereof becomes larger.

It is an object of at least one of embodiments of the present invention to solve the problem described above, and reflect an influence of a light source in a real space on an AR object more accurately.

According to one non-limiting aspect of the present invention, there is provided a non-transitory computer-readable medium including an image processing program for causing a server to perform functions to control synthesis of a real space image and a virtual object image.

The functions include an obtaining function configured to obtain a real space image and positional information of a user terminal from the user terminal, the user terminal including a photographing device configured to photograph a real space.

The functions also include a specifying function configured to refer to a light source related information storing unit storing information defined in advance as information related to a light source (hereinafter, referred to as "light source related information") and positional information so as to be associated with each other, the specifying function being configured to specify light source related information corresponding to positional information of the user terminal.

The functions also include a setting function configured to set a virtual light source for a virtual object on a basis of the specified light source related information.

The functions also include a generating function configured to generate a virtual object image on a basis of the set virtual light source.

The functions also include an outputting function configured to output a synthetic image obtained by synthesizing the generated the virtual object image and the real space image.

According to another non-limiting aspect of the present invention, there is provided an image processing system for controlling synthesis of a real space image and a virtual object image in response to a user operation. In this case, the image processing system includes a communication network, a server, and a user terminal.

The image processing system includes an obtaining unit configured to obtain positional information on a real space image and a user terminal from the user terminal, the user terminal including a photographing device configured to photograph a real space.

The image processing system also includes a specifying unit configured to refer to a light source related information storing unit storing information defined in advance as information related to a light source (hereinafter, referred to as "light source related information") and positional information so as to be associated with each other, the specifying unit being configured to specify light source related information corresponding to positional information of the user terminal.

The image processing system also includes a setting unit configured to set a virtual light source for a virtual object on a basis of the specified light source related information.

The image processing system also includes a generating unit configured to generate a virtual object image on a basis of the set virtual light source.

The image processing system also includes an outputting unit configured to output a synthetic image obtained by synthesizing the generated the virtual object image and the real space image.

According to still another non-limiting aspect of the present invention, there is provided a non-transitory computer-readable medium including an image processing program for causing a user terminal to perform functions to control synthesis of a real space image and a virtual object image.

The functions include an obtaining function configured to obtain a real space image obtained by photographing a real space and positional information of the user terminal.

The functions also include a specifying function configured to refer to a light source related information storing unit storing information defined in advance as information related to a light source (hereinafter, referred to as "light source related information") and the positional information so as to be associated with each other, the specifying function being configured to specify light source related information corresponding to positional information.

The functions also include a setting function configured to set a virtual g source for a virtual object on a basis of the specified light source related information.

The functions also include a generating function configured to generate a virtual object image on a basis of the set virtual light source.

The functions also include an outputting function configured to output a synthetic image obtained by synthesizing the generated the virtual object image and the real space image.

According to each of the embodiments of the present application, one or two or more shortages are solved.

BRIEF DESCRIPTION OF DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

Hereinafter, examples of embodiments according to the present invention will be described with reference to the drawings. Note that various components in the respective embodiments described below can be appropriately combined without any contradiction or the like. In addition, the description of the content described as a certain embodiment may be omitted in another embodiment. Further, the content of an operation or processing that does not relate to features of each of the embodiments may be omitted. Moreover, the order of various processes that constitute various flows described below may be changed without any contradiction or the like of processing content.

First Embodiment

Figure 1:
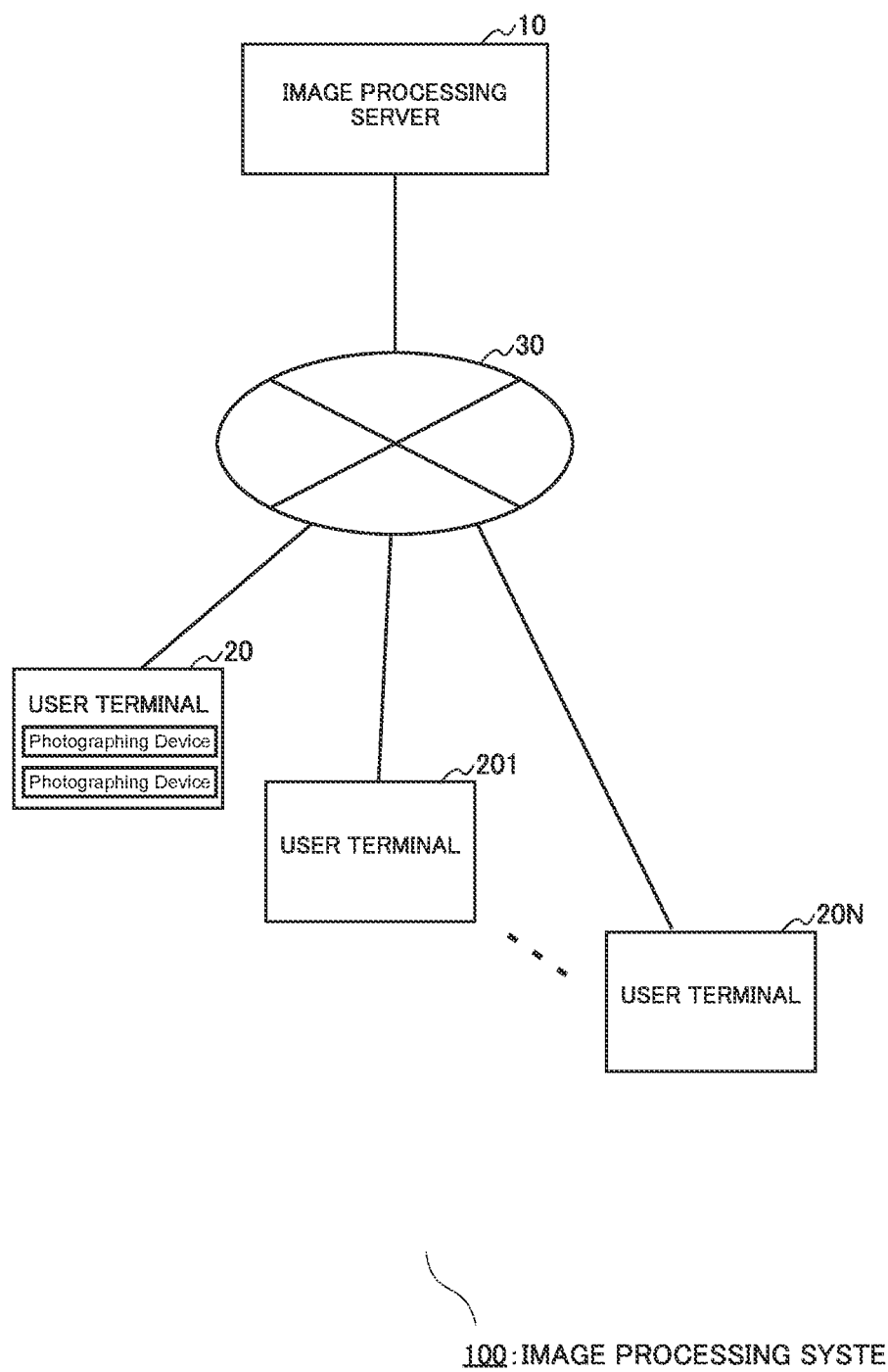
FIG. 1 is a block diagram illustrating an example of a configuration of an image processing system corresponding to at least one of the embodiments of the present invention.

FIG. 1 is a block diagram illustrating an example of a configuration of an image processing system 100 according to one embodiment of the present invention. As illustrated in FIG. 1, the image processing system 100 includes an image processing server 10 (hereinafter, referred to as a "server 10") and user terminals 20, and 201 to 20N ("N" is an arbitrary integer) respectively used by users of the image processing system 100. In this regard, the configuration of the image processing system 100 is not limited to this configuration. The image processing system 100 may be configured so that a plurality of users uses a single user terminal, or may be configured so as to include a plurality of servers.

Each of the server 10 and the plurality of user terminals 20, and 201 to 20N is connected to a communication network 30 such as the Internet. In this regard, although it is not illustrated in the drawings, the plurality of user terminals 20, and 201 to 20N is connected to the communication network 30 by executing data communication with base stations managed by a telecommunication carrier by means of a radio communication line.

The image processing system 100 includes the server 10 and the plurality of user terminals 20, and 201 to 20N, thereby performing various kinds of functions for executing various kinds of processes in response to an operation of the user.

The server 10 is managed by an administrator of the image processing system 100, and has various kinds of functions to provide information regarding the various kinds of processes to each of the plurality of user terminals 20, and 201 to 20N. In present embodiment, the server 10 is constructed by an information processing apparatus, such as a WWW server, and includes a storage medium for storing various kinds of information. In this regard, the server 10 is provided with a general configuration to execute various kinds of processes, such as a control unit or a communicating unit, as a computer. However, its explanation herein is omitted. Further, in the image processing system 100, it is preferable that the server 10 manages various kinds of information from a point of view to reduce a processing load on each of the plurality of user terminals 20, and 201 to 20N. However, a storage unit configured to store various kinds of information may be provided with a storage region in a state that the server 10 can access the storage region. For example, the server 10 may be configured so as to include a dedicated storage region outside the server 10.

Figure 2:
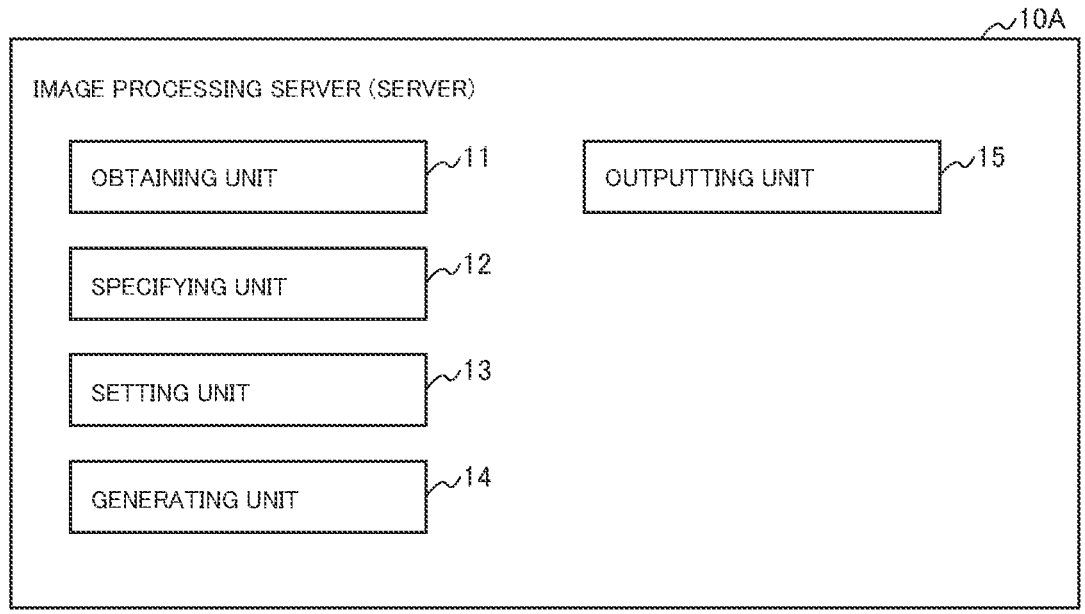
FIG. 2 is a block diagram illustrating an example of a configuration of an image processing server corresponding to at least one of the embodiments of the present invention.

FIG. 2 is a block diagram illustrating an example of a configuration of an image processing server 10A (hereinafter, referred to as a "server 10A"), which is an example of the configuration of the image processing server 10. As illustrated in FIG. 2, the server 10A at least includes an obtaining unit 11, a specifying unit 12, a setting unit 13, a generating unit 14, and an outputting unit 15.

The obtaining unit 11 has a function to obtain a real space image and positional information of a user terminal from the user terminal. The user terminal includes a photographing device configured to photograph a real space.

Here, the real space means a real or actual space. A configuration of the real space image is not limited particularly. However, it is preferable that the real space image is a moving image or a still image, which is obtained by operating a camera provided in a user terminal (for example, the user terminal 20) to photograph the real space by a user of the user terminal 20.

Further, the positional information means information for specifying a position of the user terminal 20. The positional information is not limited particularly so long as light source related information (will be described later) can be specified by the positional information. As an example of the positional information, there is general GPS information.

Further, a configuration to obtain the real space image and the positional information is not limited particularly. However, it is preferable that the obtaining unit 11 is configured so that information in which the real space image and the positional information are associated with each other is received from the user terminal 20. As an example of such a configuration, there is a configuration in which a user terminal specifies positional information thereof when a real space image is photographed, and the user terminal transmits, to a server in response to a user operation, the specified positional information, the real space image, and identification information of a user thereof or the user terminal.

The specifying unit 12 has a function to refer to a light source related information storing unit (not illustrated in the drawings) and specify information defined in advance as information related to a light source (hereinafter, referred to as "light source related information") corresponding to positional information of the user terminal 20. The light source related information and the positional information are stored in the light source related information storing unit so as to be associated with each other.

Here, a configuration of the light source related information is not limited particularly. However, it is preferable that the specifying unit 12 is configured so as to be capable of specifying intensity of natural light at a position where the real space image is photographed, a direction and color of illumination provided in a photographing space. As an example of such a configuration, there is a configuration in which positional information and features of the plurality of light sources are configured so as to be associated with each other. Further, they may be configured so that information of the plurality of light sources corresponding to variable elements such as seasons or time zones is associated with one piece of positional information.

Further, a configuration to specify the light source related information corresponding to the positional information is not limited particularly. However, it is preferable that the specifying unit 12 is configured to be capable of specifying one piece of light source related information without requiring additional information from the user. Alternatively, it may be configured to require any additional information from the user. As an example of such a configuration, there is a configuration in which light source related information associated with positional information containing at least part of the positional information obtained by the obtaining unit 11 is searched in the light source related information storing unit; a search result is presented to the user; and the light source related information selected by the user is specified.

The setting unit 13 has a function to set a virtual light source for a virtual object on the basis of the specified light source related information.

Here, the virtual object means a target that is synthesized with the real space image. A configuration of the virtual object is not limited particularly so long as a display form can be changed in accordance with the content of light source setting. As examples of such a configuration, there are a so-called 2D object and a 3D object.

Further, the phrase "set a virtual light source for a virtual object" means that predetermined parameters, such as a position or brightness of a light source, color, or a direction of light, in a virtual space in which the virtual object is arranged are determined. A configuration to set a virtual light source is not limited particularly. However, it is preferable that the setting unit 13 is configured so as to capable of setting the virtual space to be the same environment of the real space. As an example of such a configuration, there is a configuration in which after various kinds of parameters are set so that the environment of the real space that the real space image is obtained by photographing is the same as an environment of the virtual space on the basis of various kinds of information, any of the parameters can be adjusted in response to a user operation.

The generating unit 14 has a function to generate a virtual object image on the basis of the set virtual light source.

Here, a configuration to generate an image indicating a virtual object (that is, the virtual object image) is not limited particularly. However, it is preferable that the generating unit 14 is configured so that the user can recognize that the image is appearance to which an influence by the virtual light source is reflected. As an example of such a configuration, there is a configuration in which images before and after the influence by the virtual light source is reflected are generated and both the images can be displayed on a display screen of the user terminal 20 in response to a user operation.

The outputting unit 15 has a function to output a synthetic image obtained by synthesizing the generated virtual object image and the real space image.

Here, the output means a state where the user can recognize the synthetic image. A configuration to output a synthetic image is not limited particularly. However, it is preferable that the outputting unit 15 is configured so as to display the synthetic image on the display screen included in the user terminal 20. As an example of such a configuration, there is a configuration in which the server 10A is configured so as to transmit information for displaying the synthetic image to the user terminal 20.

Each of the plurality of user terminals 20, and 201 to 20N is managed by the user, and is configured by a communication terminal capable of playing a network delivery type game, such as a cellular telephone terminal, a PDA (Personal Digital Assistants), a portable game apparatus, or a so-called wearable device, for example. In this regard, the configuration of the user terminal that the image processing system 100 can include is not limited to the example described above. The user terminal may be configured so that the user can recognize the synthetic image. As the other examples of the user terminal, there are one obtained by combining various kinds of communication terminals, a personal computer, and stationary game apparatus.

Further, each of the plurality of user terminals 20, and 201 to 20N is connected to the communication network 30, and includes hardware (for example, a display device for displaying a browser screen or a game screen based on a coordinate) and software for executing various kinds of processes by communicating with the server 10A. In this regard, each of the plurality of user terminals 20, and 201 to 20N may be configured so as to be able to directly communicate with each other without the server 10A.

Next, an operation of the image processing system 100 (hereinafter, referred to as the "system 100") according to the present embodiment will be described.

Figure 3:
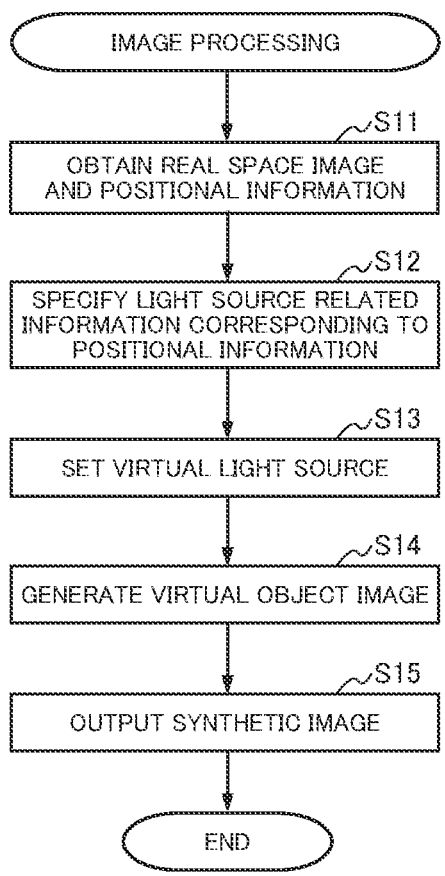
FIG. 3 is a flowchart illustrating an example of image processing corresponding to at least one of the embodiments of the present invention.

FIG. 3 is a flowchart illustrating an example of image processing executed by the system 100. In the image processing according to the present embodiment, processes related to synthesis of a real space image and a virtual object image is executed. Hereinafter, a case where the server 10A and the user terminal 20 (hereinafter, referred to as the "terminal 20") execute the image processing will be described as an example.

For example, the image processing is started in a case where the terminal 20 that accesses the server 10A satisfies a display condition of a synthetic image. Hereinafter, a case where the user who operates the terminal 20 satisfies the display condition will be described as an example.

In the image processing, the server 10A first obtains a real space image and positional information (Step S11). In the present embodiment, the server 10A receives, from the terminal 20, a synthesis request containing a real space image and positional information.

When the real space image and the positional information are obtained, the server 10A specifies light source related information corresponding to the positional information (Step S12). In the present embodiment, the server 10A refers to a predetermined storage unit (the light source related information storing unit) to specify light source related information corresponding to the positional information of the terminal 20.

When the light source related information is specified, the server 10A sets a virtual light source (Step S13). In the present embodiment, the server 10A sets a virtual light source corresponding to a virtual object on the basis of the specified light source related information.

When the virtual light source is set, the server 10A generates a virtual object image (Step S14). In the present embodiment, the server 10A generates a virtual object image on the basis of the set virtual light source.

When the virtual object image is generated, the server 10A outputs a synthetic image (Step S15), and terminates the process herein. In the present embodiment, the server 10A outputs a synthetic image obtained by synthesizing the generated virtual object image and the real space image.

Figure 4:
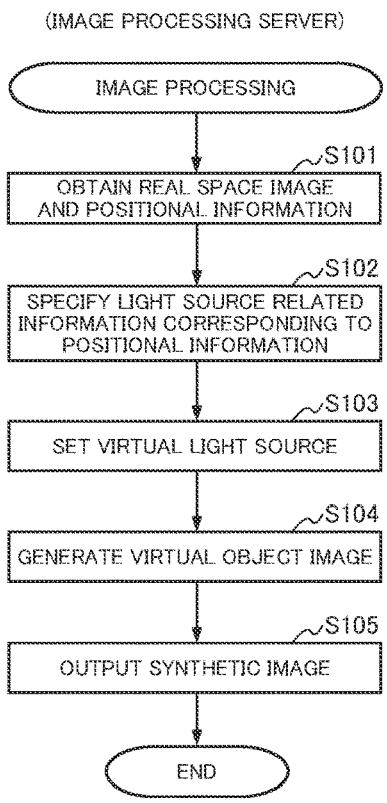
FIG. 4 is a flowchart illustrating an example of an operation of a server side in the image processing corresponding to at least one of the embodiments of the present invention.

FIG. 4 is a flowchart illustrating an example of an operation of the server 10A side in the image processing. Here, an operation of the server 10A in the system 100 will be described again.

In the image processing, the server 10A first obtains a real space image and positional information (Step S101); specifies light source related information corresponding to the obtained positional information (Step S102); sets a virtual light source on the basis of the specified light source related information (Step S103), generates a virtual object image on the basis of the set virtual light source (Step S104); and outputs a synthetic image obtained by synthesizing the generated virtual object image and the obtained real space image (Step S105).

Figure 5:
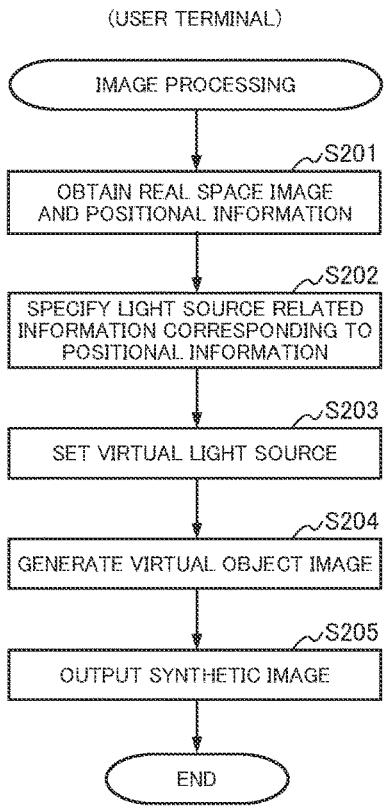
FIG. 5 is a flowchart illustrating an example of an operation of a terminal side in the image processing corresponding to at least one of the embodiments of the present invention.

FIG. 5 is a flowchart illustrating an example of an operation of the terminal 20 side in a case where the terminal 20 executes the image processing. Hereinafter, a case where the terminal 20 executes the image processing by a single body will be described as an example. In this regard, the terminal 20 is configured so as to include the similar functions to the configuration of the server 10A except for reception of various kinds of information from the server 10A. For this reason, its description is omitted from a point of view to avoid repeated explanation.

In the image processing, the terminal 20 first obtains a real space image and positional information (Step S201); specifies light source related information corresponding to the obtained positional information (Step S202); sets a virtual light source on the basis of the specified light source related information (Step S203); generates a virtual object image on the basis of the set virtual light source (Step S204); and outputs a synthetic image obtained by synthesizing the generated virtual object image and the obtained real space image (Step S205). In the present embodiment, the terminal 20 obtains the information used in each of the steps by communicating with the server 10A. In this regard, the terminal 20 may be configured so as to refer to a storage unit included therein to specify the information used in each of the steps.

As explained above, as one side of the first embodiment, the server 10A provided with the functions to control the synthesis of the real space image and the virtual object image is configured so as to include the obtaining unit 11, the specifying unit 12, the setting unit 13, the generating unit 14, and the outputting unit 15. Thus, the obtaining unit 11 obtains the positional information between the real space image and the user terminal from the user terminal provided with the photographing device configured to photograph the real space; the specifying unit 12 refers to the light source related information storing unit in which the information defined in advance as the information related to the light source (that is, the light source related information) and the positional information are stored so as to be associated with each other, and specify the light source related information corresponding to the positional information of the user terminal; the setting unit 13 sets the virtual light source corresponding to the virtual object on the basis of the specified light source related information; the generating unit 14 generates the virtual object image on the basis of the set virtual light source; and the outputting unit 15 outputs the synthetic image obtained by synthesizing the generated virtual object image and the real space image. Therefore, it is possible to reflect an influence of the light source in the real space on the AR object more accurately.

Namely, by using the light source related information with which the positional information in the real space is associated, it is possible to reflect an influence of the light source during generation of the virtual object image accurately compared with a case where the light source related information is not used. In particular, the more the light source related information is configured to be capable of accurately reproducing a light source environment in a situation that the real space image is photographed (or generated), the more natural the synthesis of the virtual object image and the real space image becomes. In other words, the more the light source related information in the real space is accumulated, the more useful it is in the sense that an influence of the light source in the real space can be reflected to the virtual object accurately.

Second Embodiment

Figure 6:
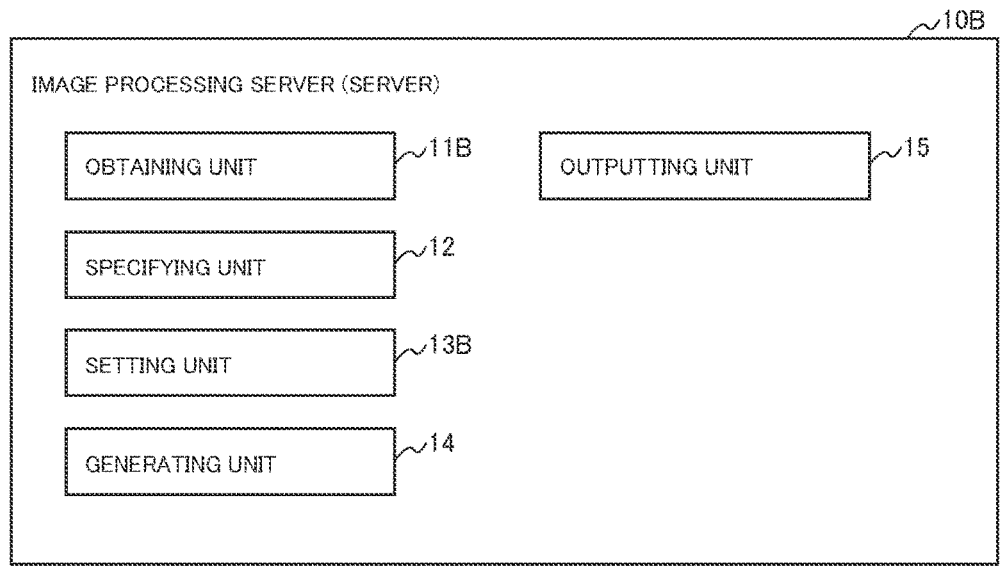
FIG. 6 is a block diagram illustrating an example of a configuration of an image processing server responding to at least one of the embodiments of the present invention.

FIG. 6 is a block diagram illustrating a configuration of an image processing server 10B (hereinafter, referred to as a "server 10B"), which is an example of the image processing server 10 in the image processing system 100 (see FIG. 1). In present embodiment, the server 10B at least includes an obtaining unit 11B, a specifying unit 12, a setting unit B, a generating unit 14, and an outputting unit 15.

The obtaining unit 11B has a function to obtain, from predetermined external equipment, information for complementing light source related information (hereinafter, referred to as "complementary information").

Here, the predetermined external equipment means various kinds of equipment that can be specified before at least the complementary information is obtained. A configuration of the predetermined external equipment is not limited particularly. However, it is preferable that the obtaining unit 11B is configured so as to be capable of obtaining information that can influence on a light source in a real space. As an example of such a configuration, there are a monitoring camera and a management apparatus that manages the monitoring camera.

Further, a configuration to obtain the complementary information is not limited particularly. However, it is preferable that obtaining unit 11B is configured so that a relationship with the light source related information is clear. As an example of such a configuration, there is a configuration in which in a case where the light source related information indicates the content that "there is a window and a shade in a north direction of a room A indicated by positional information", "the shade in the room A is closed in management information provided for the room A".

The setting unit 13B has a function to utilize complementary information in a case where a virtual light source is set.

Here, a configuration to utilize complementary information is not limited particularly. The setting unit 13B may be configured so as to require a user operation for utilization of the complementary information, or may be configured so as not to require a user operation. As an example of a configuration to require a user operation, there is a configuration in which the setting content of a virtual light source in a case where the complementary information is set and that in a case where the complementary information is not set are presented to a user, and the setting content is adjusted in response to a user operation.

Figure 7:
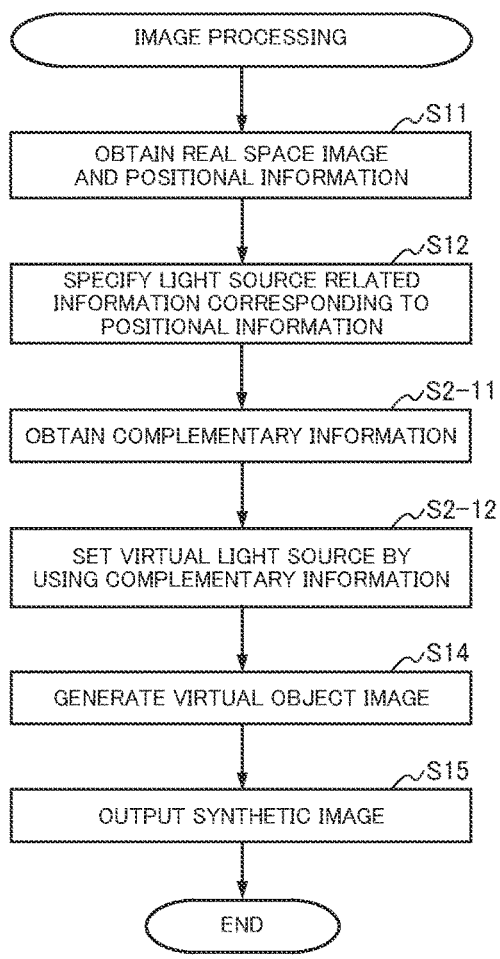
FIG. 7 is a flowchart illustrating an example of image processing corresponding to at least one of the embodiments of the present invention.

FIG. 7 is a flowchart illustrating an example of image processing executed by the system 100. Hereinafter, operations of the server 10B and a user terminal 20 (hereinafter, referred to as a "terminal 20") will be described as an example. In this regard, description of a flowchart illustrating an operation of each of the server OB and the terminal 20 is omitted from a point of view to avoid repeated explanation.

In the image processing, when light source related information is specified, the server 10B obtains complementary information (Step S2-11). In the present embodiment, the server 10B specifies external equipment related to the obtained positional information, and obtains complementary information by communicating with the specified external equipment.

When the complementary information is obtained, the server 10B utilizes the complementary information to set a virtual light source (Step S2-12). In the present embodiment, the server 10B reflects the obtained complementary information to the specified light source related information, thereby setting a virtual light source. Namely, for example, in a case where there is "information on a fluorescent light" in the light source related information and complementary information indicates that "the fluorescent light is turned ON at the time when a real space image is photographed", a virtual light source is set so as to correspond to a state where the fluorescent light becomes ON.

As explained above, as one side of the second embodiment, the server 10B is configured so as to include the obtaining unit 11B, the specifying unit 12, the setting unit 13B, the generating unit 14, and the outputting unit 15. Thus, the obtaining unit 11B obtains, from the predetermined external equipment, the information for complementing the light source related information (that is, the complementary information); and the setting unit 13B utilizes the complementary information in a case where the virtual light source is set Therefore, it is possible to utilize information accumulated in external equipment.

Third Embodiment

Figure 8:
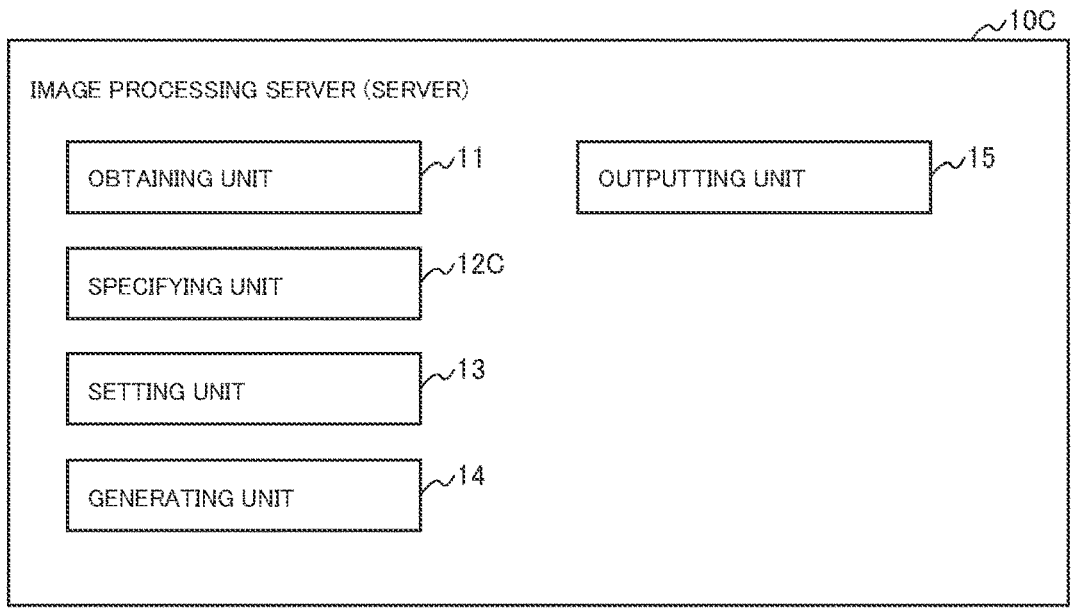
FIG. 8 is a block diagram illustrating an example of a configuration of an image processing server corresponding to at least one of the embodiments of the present invention.

FIG. 8 is a block diagram illustrating a configuration of an image processing server 10C (hereinafter, referred to as a "server 10C"), which is an example of the image processing server 10. In present embodiment, the server 10C at least includes an obtaining unit 11, a specifying unit 12C, a setting unit 13, a generating unit 14, and an outputting unit 15.

The specifying unit 12C has a function to specify, as at least part of light source related information, information regarding illumination provided in a building in which a user terminal is positioned on the basis of positional information of the user terminal.

Here, a configuration to specify information regarding illumination on the basis of positional information is not limited particularly. However, it is preferable that the specifying unit 12C is configured so that a room in which the user terminal is positioned can be specified. As examples of such a configuration, there are a configuration in which room information is also contained in positional information, and a configuration in which information on a building that can be specified from positional information is presented to a user and information for specifying a room in the building (for example, a room number) is requested to the user. In this regard, a configuration to specify a building from positional information is not limited particularly. The specifying unit 12C may be configured so as to utilize a known technique using map information.

Figure 9:
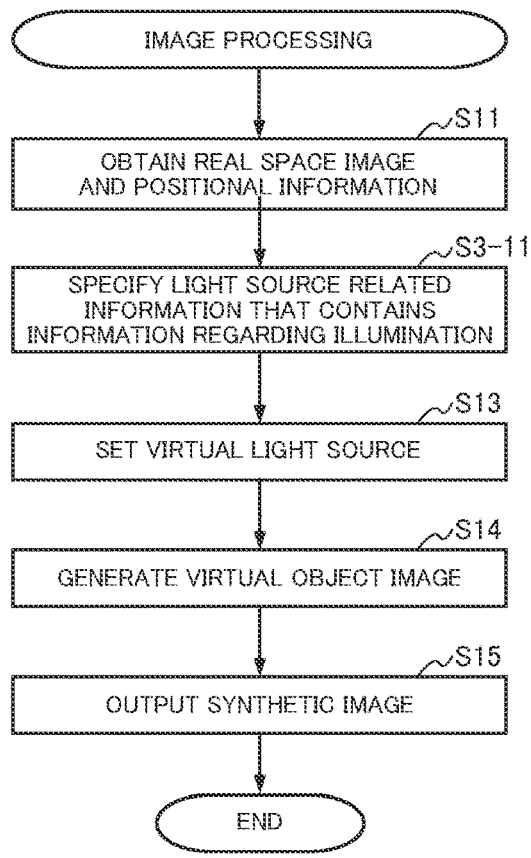
FIG. 9 is a flowchart illustrating an example of image processing corresponding to at least one of the embodiments of the present invention.

FIG. 9 is a flowchart illustrating an example of image processing executed by the system 100. Hereinafter, operations of the server 10C and a user terminal 20 (hereinafter, referred to as a "terminal 20")) will be described as an example. In this regard, a flowchart illustrating an operation of each of the server 10C and the terminal 20 is omitted from a point of view to avoid repeated explanation.

When a real space image and positional information are obtained, the server 10C specifies light source related information that contains information regarding illumination (Step S3-11). In the present embodiment, the server 10C specifies a building from the positional information obtained from the terminal 20, and specifies information regarding illumination provided in the building.

As explained above, as one side of the third embodiment, the server 10C is configured so as to include the obtaining unit 11, the specifying unit 12C, the setting unit 13, the generating unit 14, and the outputting unit 15. Thus, the specifying unit 12C specifies, as at least part of the light source related information, the information regarding illumination provided in the building in which the user terminal 20 is positioned on the basis of the positional information of the user terminal 20. Therefore, it is possible to heighten usefulness of the light source related information.

Fourth Embodiment

Figure 10:
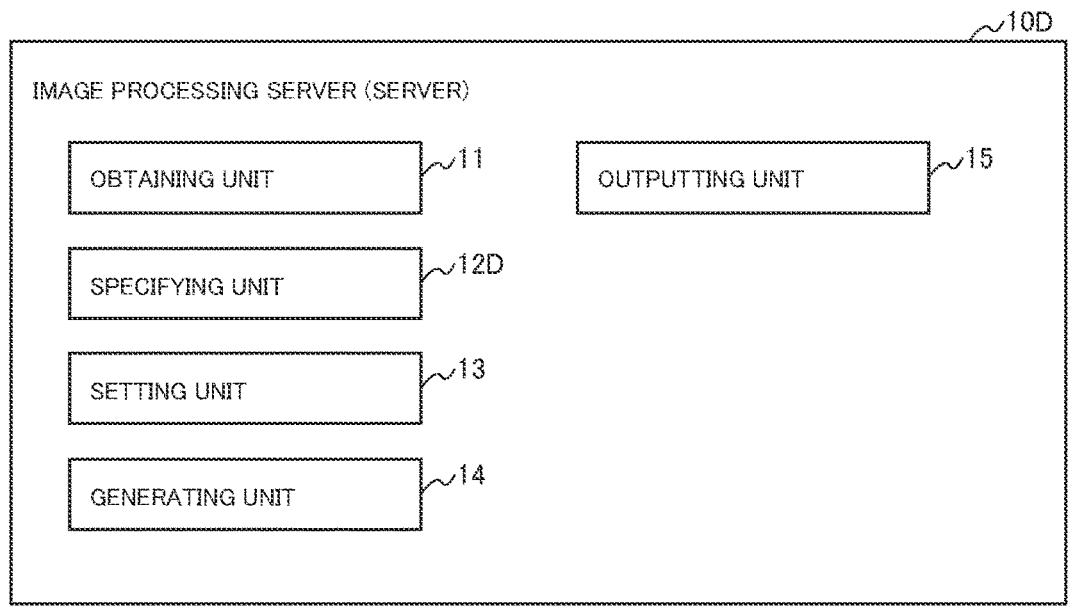
FIG. 10 is a block diagram illustrating an example of a configuration of an image processing server corresponding to at least one of the embodiments of the present invention.

FIG. 10 is a block diagram illustrating a configuration of an image processing server 10D (hereinafter, referred to as a "server 10D"), which is an example of the image processing server 10. In present embodiment, the server 10D at least includes an obtaining unit 11, a specifying unit 12D, a setting unit 13, a generating unit 14, an outputting unit 15, and a presenting unit 16.

The specifying unit 12D has a function to specify, as at least part of light source related information, information regarding a shielding object provided in a building in which a user terminal is positioned on the basis of positional information of the user terminal.

Here, the shielding object means an object that can shield light. As examples of the shielding object, there are a curtain and a shade. Further, a configuration of the information regarding a shielding object is not limited particularly. However, it is preferable that the information is configured so as to contain a positional relationship with a light source. As an example of such a configuration, there is a configuration in which the information contains positions of a window and illumination and a position of a shielding object in a building.

Further, a configuration to specify information regarding a shielding object on the basis of positional information is not limited particularly. However, it is preferable that the specifying unit 12D is configured so that the user terminal can specify a room in which the user terminal is positioned. As examples of such a configuration, there are a configuration in which room information is also contained in the positional information, and a configuration in which information on a building that can be specified from positional information is presented to a user and information for specifying a room (for example, a room number) is requested to the user. In this regard, a configuration to specify a building from positional information is not limited particularly. The specifying unit 12D may be configured so as to utilize a known technique using map information.

Figure 11:
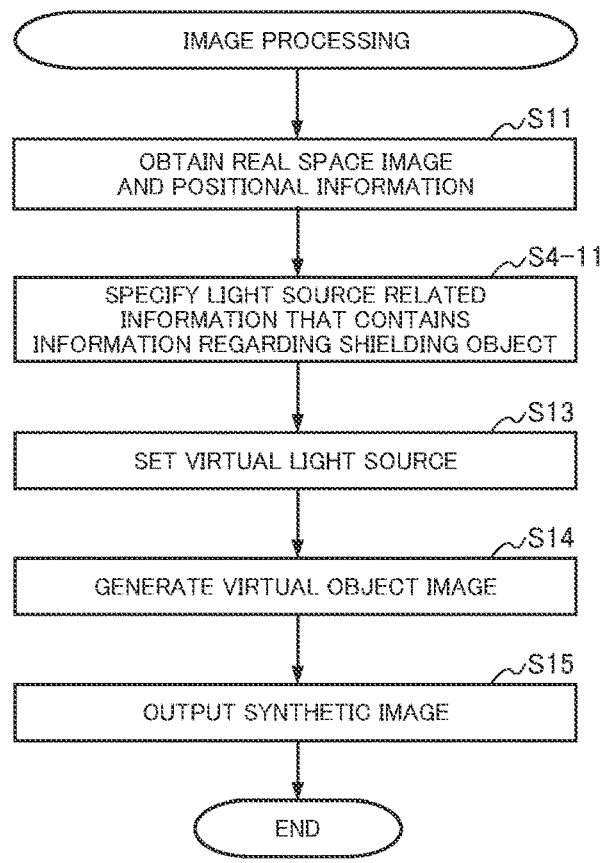
FIG. 11 is a flowchart illustrating an example of image processing corresponding to at least one of the embodiments of the present invention.

FIG. 11 is a flowchart illustrating an example of image processing executed by the system 100. Hereinafter, operations of the server 10D and a user terminal 20 (hereinafter, referred to as a "terminal 20") will be described as an example. In this regard, a flowchart illustrating an operation of each of the server 10D and the terminal 20 is omitted from a point of view to avoid repeated explanation.

When a real space image and positional information are obtained, the server 10D specifies light source related information that contains information regarding a shielding object (Step S4-11). In the present embodiment, the server 10D specifies a building from the positional information obtained from the terminal 20, and specifies information regarding a shielding object provided in the building.

As explained above, as one side of the fourth embodiment, the server 10D is configured so as to include the obtaining unit 11, the specifying unit 12D, the setting unit 13, the generating unit 14, and the outputting unit 15. Thus, the specifying unit 12D specifies, as at least part of the light source related information, the information regarding a shielding object provided in the building in which the user terminal 20 is positioned on the basis of the positional information of the user terminal 20. Therefore, it is possible to heighten usefulness of the light source related information.

Fifth Embodiment

Figure 12:
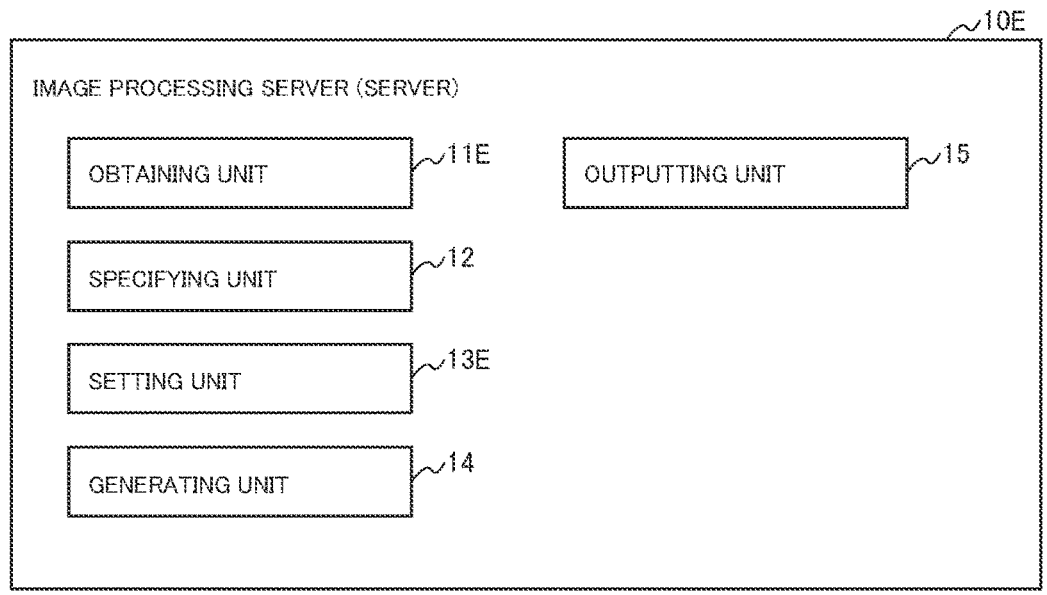
FIG. 12 is a block diagram illustrating an example of a configuration of an image processing server corresponding to at least one of the embodiments of the present invention.

FIG. 12 is a block diagram illustrating a configuration of an image processing server 10E (hereinafter, referred to as a "server 10E"), which is an example of the image processing server 10 in the image processing system 100 (see FIG. 1). In present embodiment, the server 10E at least includes an obtaining unit 11E, a specifying unit 12, a setting unit 13E, a generating unit 14, and an outputting unit 15.

The obtaining unit 11E has a function to obtain, from a user terminal, an image photographed by a second photographing device (hereinafter, referred to as "other image"), The second photographing device is different from a first photographing device configured to photograph an image that is displayed on a display screen of the user terminal.

Here, a difference between the first and second photographing devices means that photographing ranges thereof are at least different from each other. A configuration of the second photographing device is not limited particularly so long as the second photographing device is configured to utilize a second photographing range (that is, a sub range) that is different from a photographing range when the first photographing device photographs an image during display (that is, a main range). However, it is preferable that the second photographing range is a photographing range in a direction different from that of the main range. As an example of such a configuration, there is a sub camera against a main camera in a so-called smartphone. In this regard, the user terminal may be configured so that images (including a real space image and the other image) photographed by two photographing devices can be displayed at the same time.

Further, a configuration to obtain the other image is not limited particularly. However, it is preferable that the obtaining unit 11E is configured so that the real space image and the other image are photographed at the same time, whereby a surrounding environment when the real space image is photographed (in particular, a situation regarding a light source) can be estimated. As an example of such a configuration, there is a configuration in which the real space image and the other image are stored so as to be associated with each other at the time of photographing.

The setting unit 13E has a function to utilize the real space image and the other image in a case where a virtual light source is set.

Here, a configuration to utilize the real space image and the other image obtained from the user terminal to set the virtual light source is not limited particularly. However, it is preferable that the setting unit 13E is configured so as to detect and utilize a balance of light from two cameras. In this regard, a configuration to estimate a light source environment, such as the balance of light, from a plurality of images obtained by photographing a real space is not limited particularly. The setting unit 13E may be configured so as to use a known technique.

Figure 13:
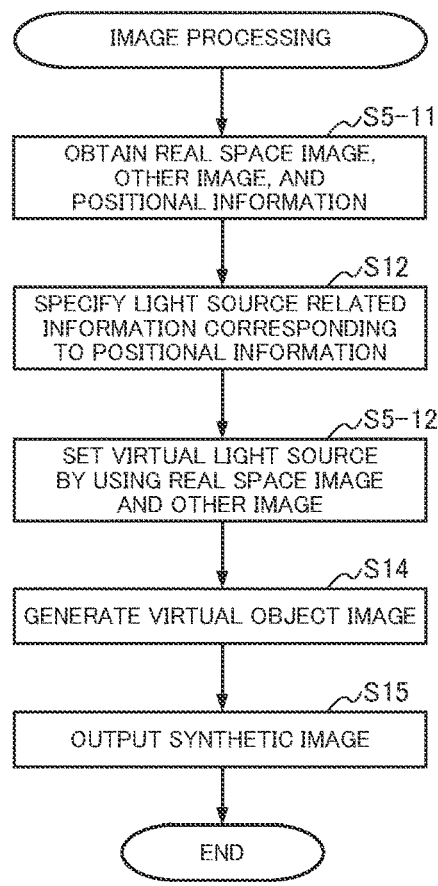
FIG. 13 is a flowchart illustrating an example of image processing corresponding to at least one of the embodiments of the present invention.

FIG. 13 is a flowchart illustrating an example of image processing executed by the system 100. Hereinafter, operations of the server 10E and a user terminal 20 (hereinafter, referred to as a "terminal 20") will be described as an example. In this regard, a flowchart illustrating an operation of each of the server 10E and the terminal 20 is omitted from a point of view to avoid repeated explanation.

In the image processing, the server 10E first obtains a real space image, the other image, and positional information (Step S5-11). In the present embodiment, the server 10E receives, from the terminal 20, a synthesis request containing a real space image, the other image photographed at the same time of the real space image, and positional information indicating a location at which the terminal 20 is positioned at the time of photographing.

When the real space image, the other image, and the positional information are obtained and light source related information corresponding to the positional information is specified, the server 10E sets a virtual light source (Step S5-12). In the present embodiment, the server 10A reflects a light source environment estimated from the real space image and the other image to the specified light source related information, thereby setting a virtual light source.

As explained above, as one side of the fifth embodiment, the server 10E is configured so as to include the obtaining unit 11E, the specifying unit 12, the setting unit 13E, the generating unit 14, and the outputting unit 15. Thus, the obtaining unit 11E obtains, from the user terminal, the image photographed by the second photographing device (that is, the other image), the second photographing device being different from a first photographing device configured to photograph the image that is displayed on the display screen of the user terminal; and the setting unit 13E utilizes the real space image and the other image in a case where the virtual light source is set. Therefore, it is possible to reflect an influence of the light source in the real space on the virtual object more accurately compared with a case where only the light source related information is used, for example.

Sixth Embodiment

Figures 14, 15:
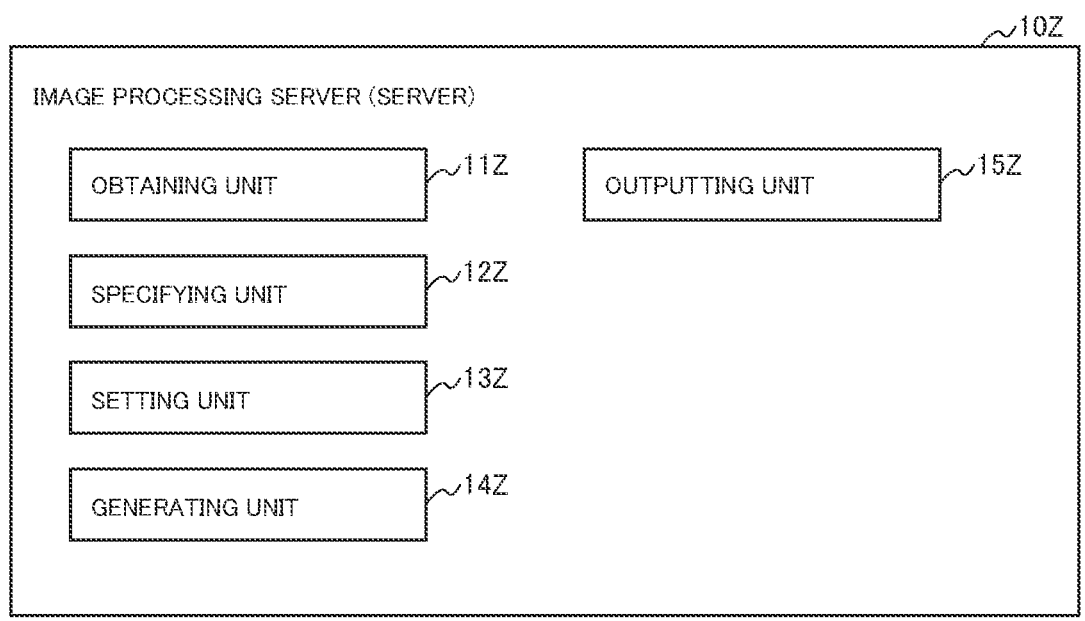
FIG. 14 is a block diagram illustrating an example of a configuration of an image processing server corresponding to at least one of the embodiments of the present invention.
FIG. 15 is an explanatory drawing for explaining an example of a storage state of information corresponding to at least one of the embodiments of the present invention.

FIG. 14 is a block diagram illustrating a configuration of an image processing server 10Z (hereinafter, referred to as a "server 10Z"), which is an example of the image processing server 10 in the image processing system 100 (see FIG. 1). In the present embodiment, the server 10Z at least includes an obtaining unit 11Z, a specifying unit 12Z, a setting unit 13Z, a generating unit 14Z, and an outputting unit 15Z.

The obtaining unit 11Z has a function to obtain a real space image and positional information of a user terminal 20 (hereinafter, referred to as a "terminal 20"), which is an example of the user terminal 20 provided with a photographing device configured to photograph a real space (see FIG. 1, for example) from the terminal 20. Hereinafter, a case where the obtaining unit 11Z obtains, from the terminal 20 provided with a camera, a real space image obtained by photographing a real space by means of the camera and positional information specified by a GPS function of the terminal 20 will be described as an example.

The specifying unit 12Z has a function to refer to a light source related information storing unit and specify information defined in advance as information related to a light source (hereinafter, referred to as "light source related information") corresponding to positional information of the terminal 20. The light source related information and the positional information are stored in the light source related information storing unit so as to be associated with each other. Hereinafter, a case where the specifying unit 12Z specifies information related to at least one of natural light, illumination, and a shielding object as the light source related information corresponding to the positional information of the terminal 20 will be described as an example.

The setting unit 13Z has a function to set a virtual light source for a virtual object on the basis of the specified light source related information. Hereinafter, a case where the setting unit 13Z sets a virtual light source for causing the terminal 20 to display a character that appears in a video game on the basis of the specified light source related information will be described as an example.

The generating unit 14Z has a function to generate a virtual object image on the basis of the set virtual light source. Hereinafter, a case where the generating unit 14Z draws the character on the basis of the set virtual light source will be described as an example.

The outputting unit 15Z has a function to output a synthetic image obtained by synthesizing the generated virtual object image and the real space image. Hereinafter, a case where the outputting unit 15Z causes the terminal 20 to display, on a display screen thereof, a synthetic image obtained by synthesizing the drawn character image and the real space image will be described as an example.

FIG. 15 is an explanatory drawing for explaining an example of a storage state of information that is stored in a storage unit (not illustrated in the drawings) included in the server 10. As illustrated in FIG. 15, positional information and light source related information are stored in the storage unit so as to be associated with each other.

Here, the positional information means information by which a position in a real space can be specified. A configuration of the positional information is not limited particularly so long as the position of the real space can be specified by the positional information. However, it is preferable that the specifying unit 12Z is configured so that facility in which a user is positioned can be specified. As examples of the positional information, there are longitude and latitude, a facility name, and a floor. Further, the specifying unit 12Z may be configured so that the positional information contains information regarding the facility (for example, a floor or a room number).

Further, the light source related information means information by which a light source if a real space can be specified. A configuration of the light source related information is not limited particularly so long as information regarding a light source (for example, a position of a light source and a direction of light) can be specified. However, it is preferable that the light source related information may be configured so that even the same position contains plural kinds of information corresponding to date and time or weather. As examples of the light source related information, there are a position of a window, a type of a shielding object, and a type number of illumination.

Figure 16:
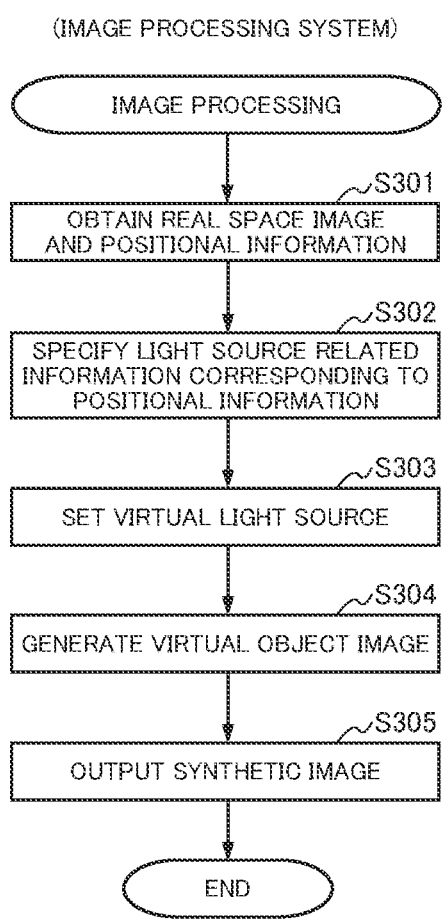
FIG. 16 is a flowchart illustrating an example of image processing corresponding to at least one of the embodiments of the present invention.

FIG. 16 is a flowchart illustrating an example of image processing executed by an image processing system 100Z (hereinafter, referred to as a "system 100Z") provided with the server 10Z. In the image processing according to the present embodiment, processes related to synthesis of a real space image and a virtual object image is executed. Hereinafter, each of the processes will be described. In this regard, the order of the respective processes may be changed without any contradiction or the like of processing content.

For example, the image processing is started in a case where the terminal 20 that accesses the server 10Z satisfies a display condition of a synthetic image. Hereinafter, a case where a user who operates the terminal 20 inputs a display request for an AR image in a playing video game will be described as an example.

In the image processing, the system 100Z first obtains a real space image and positional information (Step S301). In the present embodiment, the server 10Z receives, from the terminal 20, a synthesis request containing a real space image and positional information.

When the real space image and the positional information are obtained, the system 100Z specifies light source related information corresponding to the positional information (Step S302). In the present embodiment, the server 10Z specifies light source related information corresponding to the positional information of the terminal 20 by searching a predetermined storage unit.

When the light source related information is specified, the system 100Z sets a virtual light source (Step S303). In the present embodiment, the server 10Z sets a virtual light source for a virtual object on the basis of the specified light source related information.

When the virtual light source is set, the system 100Z generates a virtual object image (Step S304). In the present embodiment, the server 10Z draws a character image corresponding to a display request for an AR image on the basis of the set virtual light source.

When the virtual object image is generated, the system 100Z outputs a synthetic image (Step S305), and terminates the process herein. In the present embodiment, the server 10Z transmits, to the terminal 20, information for causing the terminal 20 to display a synthetic image obtained by synthesizing the drawn character image and the real space image on a display screen.

As explained above, as one side of the sixth embodiment, the server 10Z provided with the functions to control the synthesis of the real space image and the virtual object image is configured so as to include the obtaining unit 11Z, the specifying unit 12Z, the setting unit 13Z, the generating unit 14Z, and the outputting unit 15Z. Thus, the obtaining unit 11Z obtains, from the terminal 20 provided with the photographing device configured to photograph the real space, the real space image and the positional information of the user terminal; the specifying unit 12Z refers to the light source related information storing unit for storing the information defined in advance as the information related to the light source (that is, the light source related information) and the positional information so as to be associated with each other, and specifies the light source related information corresponding to the positional information of the user terminal; the setting unit 13Z sets the virtual light source for the virtual object (for example, the character as the AR object) on the basis of the specified light source related information; the generating unit 14Z generates the virtual object image on the basis of the set virtual light source (for example, draws a character to which the virtual light source is reflected); and the outputting unit 15Z outputs the synthetic image obtained by synthesizing the generated virtual object image and the real space image (for example, causes the terminal 20 to display the AR image). Therefore, it is possible to reflect an influence of the light source in the real space on the AR object more accurately.

In this regard, it has not been mentioned particularly in the sixth embodiment described above. However, the server 10Z may be configured so as to: obtain information for complementing the light source related information (complementary information) from predetermined external equipment; and utilize the complementary information when the virtual light source is set. As an example of such a configuration, there is a configuration in which information related to a light source (for example, on/off of illumination or opening/closing of a shielding object) is obtained from a monitoring camera of facility in which a user terminal is positioned, and the obtained information is set as complementary information. By configuring the server 10Z in this manner, it is possible to utilize information accumulated in external equipment for displaying the AR image.

In this regard, a configuration to obtain complementary information is not limited particularly. The server 10Z may be configured so as to work with existing service (for example, map information service). Further, even in the same room, there are a case where outside light shines thereon and a case where outside light does not shine thereon. For this reason, the server 10Z may be configured so as to utilize an environment of a room as the complementary information. Namely, it is preferable that an environment is digitalized, and the server 10Z is configured so as to utilize a distribution map of light as the complementary information. By configuring the server 10Z in this manner, it is possible to use information on a position that becomes a blind area of the camera for estimate of light source information, compared with the light source information is estimated from the camera of the user terminal, for example. Namely, by applying a light environment to an area where the user terminal exists, it is possible to obtain information that is familiar to calculation of the light source information.

Further, in the example of the sixth embodiment described above, the server 10Z is configured so as to specify, as at least part of the light source related information, information regarding illumination provided in a building in which the user terminal is positioned on the basis of the positional information of the user terminal. Therefore, it is possible to heighten usefulness of the light source related information.

Further, it has not been mentioned particularly in the sixth embodiment described above. However, the server 10Z may be configured so as to specify, as at least part of the light source related information, information regarding a shielding object provided in a building in which the user terminal is positioned on the basis of the positional information of the user terminal. Therefore, it is possible to heighten usefulness of the light source related information.

In this regard, it has not been mentioned particularly in the sixth embodiment described above. However, the server 10Z may be configured so as to: obtain, from the user terminal, an image photographed by a second photographing device (the other image) that is different from a first photographing device configured to photograph an image displayed on the display screen of the user terminal; and utilize a real space image and the other image in a case where the virtual light source is set. As an example of such a configuration, there is a configuration in which a position of the sun is specified by positional information and a compass to be determined as key light (strong light), and a balance of light is detected from images obtained by a main camera and a sub camera provided in the terminal 20 to set a virtual light source. By using the main camera and the sub camera that respectively have different photographing ranges, it is possible to reflect an influence of the light source in the real space on the AR object more accurately compared with a case where only the light source related information is used, for example.

In this regard, it has not been mentioned particularly in the sixth embodiment described above. However, the server 10Z may be configured so as to set a character that operates in response to a user operation to a virtual object. As an example of such a configuration, there is a configuration in which a moving operation for a character image displayed on the display screen of the terminal 20 is received from a user; a position of a character after movement in response to the moving operation is determined; the character image to which a virtual light source at the determined position after movement is reflected is drawn; and the terminal 20 is caused to display a synthetic image. By configuring the server 10Z in this manner, it is possible to provide the user with a feeling so that a character image further exists in a real space.

In this regard, it has not been mentioned particularly in the sixth embodiment described above. However, the server 10Z may be configured so as to: obtain time information corresponding to a real space image; and specify light source related information on the basis of the time information. As an example of such a configuration, there is a configuration in which date and time when a real space image is photographed or date and time when a synthetic image is generated are obtained from the terminal 20 provided with a calendar function, and light source related information is searched by also containing a the obtained date and time as a search condition. By configuring the server 10Z in this manner, it is possible to reflect an influence of the light source in the real space on the virtual object more accurately.

As explained above, one or two or more shortages can be solved by each of the embodiments according to the present application. In this regard, the effects by each of the embodiments are non-limiting effects or one example of the non-limiting effects.

In this regard, in each of the embodiments described above, each of the plurality of user terminals 20, 201 to 20N and the server 10 executes the various kinds of processing described above in accordance with various kinds of control programs (for example, an image processing program) stored in the storage device with which the corresponding terminal or server is provided.

Further, the configuration of the system 100 is not limited to the configuration that has been explained as an example of each of the embodiments described above. For example, the system 100 may be configured so that the server 10 executes a part or all of the processes that have been explained as the processes executed by the user terminal 20. Alternatively, the system 100 may be configured so that any of the plurality of user terminals 20, 201 to 20N (for example, the user terminal 20) executes a part or all of the processes that have been explained as the processes executed by the server 10. Further, the system 100 may be configured so that a part or all of the storage unit included in the server 10 is included in any of the plurality of user terminals 20, 201 to 20N. Namely, the system 100 may be configured so that a part or all of the functions of any one of the user terminal 20 and the server 10 according to the system 100 is included in the other.

Further, the system 100 may be configured so that the program causes a single apparatus to perform a part or all of the functions that have been explained as the example of each of the embodiments described above without including a communication network.

APPENDIX

The explanation of the embodiments described above has been described so that the following inventions can be at least performed by a person having a normal skill in the art to which the present invention belongs.

(1) A non-transitory computer-readable medium including an image processing program for causing a server to perform functions to control synthesis of a real space image and a virtual object image, the functions comprising:

an obtaining function configured to obtain positional information of a real space image and a user terminal from the user terminal, the user terminal including a photographing device configured to photograph a real space;

a specifying function configured to refer to a light source related information storing unit storing information defined in advance as information related to a light source (hereinafter, referred to as "light source related information") and positional information so as to be associated with each other, the specifying function being configured to specify light source related information corresponding to positional information of the user terminal;

a setting function configured to set a virtual light source for a virtual object on a basis of the specified light source related information;

a generating function configured to generate a virtual object image on a basis of the set virtual light source; and an outputting function configured to output a synthetic image obtained by synthesizing the generated the virtual object image and the real space image.

(2) The non-transitory computer-readable medium according to (1), wherein the obtaining function includes a function configured to obtain, from predetermined external equipment, information for complementing the light source related information (hereinafter, referred to as "complementary information"), and wherein the setting function includes a function configured to utilize the complementary information in a case where the virtual light source is set.

(3) The non-transitory computer-readable medium according to (1) or (2), wherein the specifying function includes a function configured to specify, as at least a part of the light source related information, information regarding illumination provided in a building on the basis of the positional information of the user terminal, the user terminal being positioned in the building.

(4) The non-transitory computer-readable medium according to any one of (1) to (3), wherein the specifying function includes a function configured to specify, as at least a part of the light source related information, information regarding a shielding object on the basis of the positional information of the user terminal, the shielding object being provided in a building in which the user terminal is positioned.

(5) The non-transitory computer-readable medium according to any one of (1) to (4), wherein the obtaining function includes a function configured to obtain, from the user terminal, an image photographed by a second photographing device (hereinafter, referred to as "other image"), the second photographing device being different from the photographing device that photographs an image displayed on a display screen of the user terminal, and wherein the setting function includes a function configured to utilize the real space image and the other image in a case where the virtual light source is set.

(6) The non-transitory computer-readable medium according to any one of (1) to (5), wherein the setting function include a function configured to set a character operated in accordance with a user operation to the virtual object.

(7) The non-transitory computer-readable medium according to any one of (1) to (6), wherein the obtaining function includes a function configured to obtain time information corresponding to the real space image, and wherein the specifying function includes a function configured to specify the light source related information on a basis of the time information.

(8) A non-transitory computer-readable medium including an image processing program for causing a user terminal to perform at least one function of the functions that the image processing program described in any one of (1) to (7) causes the server to perform, the user terminal being capable of communicating with the server.

(9) A server into which the image processing program described in any one of (1) to (7) is installed.

(10) An image processing system for controlling synthesis of a real space image and a virtual object image in response to a user operation, the image processing system comprising a communication network, a server, and a user terminal, the image processing system comprising:

an obtaining unit configured to obtain positional information of a real space image and a user terminal from the user terminal, the user terminal including a photographing device configured to photograph a real space;

a specifying unit configured to refer to a light source related information storing unit storing information defined in advance as information related to a light source (hereinafter, referred to as "light source related information") and positional information so as to be associated with each other, the specifying unit being configured to specify light source related information corresponding to positional information of the user terminal;

a setting unit configured to set a virtual light source for a virtual object on a basis of the specified light source related information;

a generating unit configured to generate a virtual object image on a basis of the set virtual light source; and an outputting unit configured to output a synthetic image obtained by synthesizing the generated the virtual object image and the real space image.

(11) The image processing system according to (10), wherein the server includes the obtaining unit, the specifying unit, the setting unit, and the generating unit, and wherein the user terminal includes the outputting unit configured to output a game screen to a display screen of a display device, the game screen indicating the synthetic image generated by the generating unit.

(12) A non-transitory computer-readable medium including an image processing program for causing a user terminal to perform terminal functions to control synthesis of a real space image and a virtual object image, the terminal functions comprising:

a function configured to receive, from a server, information regarding server functions included in the server; and a function configured to execute an input or an output corresponding to each of the server functions, wherein the server comprises the server functions including:

an obtaining function configured to obtain positional information of a real space image and a user terminal from the user terminal, the user terminal including a photographing device configured to photograph a real space;

a specifying function configured to refer to a light source related information storing unit storing information defined in advance as information related to a light source (hereinafter, referred to as "light source related information") and positional information so as to be associated with each other, the specifying function being configured to specify light source related information corresponding to positional information of the user terminal;

a setting function configured to set a virtual light source for a virtual object on a basis of the specified light source related information;

a generating function configured to generate a virtual object image on a basis of the set virtual light source; and an outputting function configured to output a synthetic image obtained by synthesizing the generated the virtual object image and the real space image.

(13) A non-transitory computer-readable medium including an image processing program for causing a user terminal to perform functions to control synthesis of a real space image and a virtual object image, the functions comprising:

an obtaining function configured to obtain a real space image obtained by photographing a real space and positional information of the user terminal;

a specifying function configured to refer to a light source related information storing unit storing information defined in advance as information related to a light source hereinafter, referred to as "light source related information") and the positional information so as to be associated with each other, the specifying function being configured to specify light source related information corresponding to positional information;

a setting function configured to set a virtual light source for a virtual object on a basis of the specified light source related information;

a generating function configured to generate a virtual object image on a basis of the set virtual light source; and an outputting function configured to output a synthetic image obtained by synthesizing the generated the virtual object image and the real space image.

(14) A non-transitory computer-readable medium including an image processing program for causing a server to perform at least one function of the functions that the image processing program described in (13) causes the user terminal to perform, the server being capable of communicating with the user terminal.

(15) A user terminal into which the image processing program according to (12) or (13) installed.

(16) An image processing method of controlling synthesis of a real space image and a virtual object image, the image processing method comprising:

an obtaining process configured to obtain positional information of a real space image and a user terminal from the user terminal, the user terminal including a photographing device configured to photograph a real space;

a specifying process configured to refer to a light source related information storing unit storing information defined in advance as information related to a light source (hereinafter, referred to as "light source related information") and positional information so as to be associated with each other, the specifying process being configured to specify light source related information corresponding to positional information of the user terminal;

a setting process configured to set a virtual light source for a virtual object on a basis of the specified light source related information;

a generating process configured to generate a virtual object image on a basis of the set virtual light source; and an outputting process configured to output a synthetic image obtained by synthesizing the generated the virtual object image and the real space image.

(17) An image processing method executed by an image processing system for controlling synthesis of a real space image and a virtual object image, the image processing system including a communication network, a server, and a user terminal, the image processing method comprising:

an obtaining process configured to obtain positional information of a real space image and a user terminal from the user terminal, the user terminal including a photographing device configured to photograph a real space;

a specifying process configured to refer to a light source related information storing unit storing information defined in advance as information related to a light source (hereinafter, referred to as "light source related information") and positional information so as to be associated with each other, the specifying process being configured to specify light source related information corresponding to positional information of the user terminal;

a setting process configured to set a virtual light source for a virtual object on a basis of the specified light source related information;

a generating process configured to generate a virtual object image on a basis of the set virtual light source; and an outputting process configured to output a synthetic image obtained by synthesizing the generated the virtual object image and the real space image.

INDUSTRIAL APPLICABILITY

According to one of the embodiments of the present invention, it is useful to reflect an influence of a light source in a real space on an Alt object more accurately.

What is claimed is:

1. A non-transitory computer-readable medium including an image processing program for causing a server to perform functions to control synthesis of a real space image and a virtual object image, the functions comprising:
obtaining the real space image and positional information of a user terminal from the user terminal, the user terminal including a first photographing device configured to photograph the real space image;
referring to a storage that stores light source related information defined in advance and the positional information associated with each other;
specifying light source related information corresponding to the positional information of the user terminal;
setting a virtual light source for a virtual object on a basis of the specified light source related information;
generating a virtual object image on a basis of the set virtual light source;
synthesizing the virtual object image and the real space image into a synthetic image; and
outputting the synthetic image,
wherein the obtaining the real space image and the positional information of the user terminal comprises obtaining, from the user terminal, another image on a display screen of the user terminal photographed by a second photographing device different from the first photographing device, and
wherein the setting the virtual light source comprises using the real space image and the another image when the virtual light source is set.

2. The non-transitory computer-readable medium according to claim 1,
wherein the functions further includes obtaining, from predetermined external equipment, complementary information for complementing the light source related information, and
using the complementary information when the virtual light source is set.

3. The non-transitory computer-readable medium according to claim 1,
wherein the referring includes specifying, as at least a part of the light source related information, information regarding illumination provided in a building on a basis of the positional information of the user terminal, the user terminal being positioned in the building.

4. The non-transitory computer-readable medium according to claim 1,
wherein the referring includes specifying, as at least a part of the light source related information, information regarding a shielding object on a basis of the positional information of the user terminal, the shielding object being provided in a building in which the user terminal is positioned.

5. The non-transitory computer-readable medium according to claim 1,
wherein the functions further includes setting a character operated in accordance with a user operation to the virtual object.

6. The non-transitory computer-readable medium according to claim 1,
wherein the functions further includes obtaining time information corresponding to the real space image, and
wherein the referring includes specifying the light source related information on a basis of the time information.

7. An image processing system for controlling synthesis of a real space image and a virtual object image in response to a user operation, the image processing system comprising:
a communication network;
a server;
a user terminal comprising:
a first photographing device configured to photograph the real space image; and
a second photographing device configured to photograph another image on a display screen of the user terminal;
a storage stores first light source related information defined in advance and positional information associated with each other; and
a controller configured to:
obtain the real space image, the another image and positional information of the user terminal;
refer to the storage comprising the first light source related information;
specify the second light source related information corresponding to the positional information of the user terminal among the first light source related information;
set a virtual light source for a virtual object on a basis of the specified second light source related information using the real space image and the another image;
generate the virtual object image on a basis of the set virtual light source;
synthesize the generated virtual object image and the real space image into a synthetic image; and
output the synthetic image.

8. A non-transitory computer-readable medium including an image processing program for causing a user terminal to perform functions to control synthesis of a real space image and a virtual object image, the functions comprising:
obtaining the real space image obtained by photographing a real space and positional information of the user terminal;
referring to a storage that stores light source related information defined in advance and the positional information associated with each other;
specifying light source related information corresponding to the positional information of the user terminal;
setting light source for a virtual object on a basis of the specified light source related information;
generating a virtual object image on a basis of the set virtual light source;
synthesizing the virtual object image and the real space image into a synthetic image; and
outputting the synthetic,
wherein the obtaining the real space image and the positional information of the user terminal comprises obtaining, from the user terminal, another image on a display screen of the user terminal photographed by a second photographing device different from the first photographing device, and wherein the setting the virtual light source comprises using the real space image and the another image when the virtual light source is set.

* * * * *